US011324201B1

(12) United States Patent
Benishai et al.

(10) Patent No.: US 11,324,201 B1
(45) Date of Patent: May 10, 2022

(54) REVERSIBLE DOG HARNESS WITH MULTIPLE LEASH CONNECTORS

(71) Applicants: Sunny Benishai, New York, NY (US); Evan Oshan, New York, NY (US)

(72) Inventors: Sunny Benishai, New York, NY (US); Evan Oshan, New York, NY (US)

(*) Notice: Subject to any disclaimer, the term of this patent is extended or adjusted under 35 U.S.C. 154(b) by 204 days.

(21) Appl. No.: 16/529,474

(22) Filed: Aug. 1, 2019

Related U.S. Application Data

(63) Continuation-in-part of application No. 29/691,450, filed on May 16, 2019.

(60) Provisional application No. 62/747,155, filed on Oct. 18, 2018.

(51) Int. Cl.
*A01K 27/00* (2006.01)

(52) U.S. Cl.
CPC .................. *A01K 27/002* (2013.01)

(58) Field of Classification Search
CPC ............... A01K 27/002; A01K 27/00
See application file for complete search history.

(56) References Cited

U.S. PATENT DOCUMENTS

| | | | | |
|---|---|---|---|---|
| 1,906,043 A * | 4/1933 | Bernstein | ............. | A01K 27/002 119/856 |
| D313,677 S | 1/1991 | Hammon et al. | | |
| 5,325,819 A | 7/1994 | Krauss | | |
| 6,662,755 B2 * | 12/2003 | Kato | ..................... | A01K 13/006 119/856 |
| D511,596 S | 11/2005 | Mugford | | |
| D633,257 S | 2/2011 | Trias | | |
| D638,176 S | 5/2011 | Mugford | | |
| D652,581 S | 1/2012 | Evans | | |
| 8,166,924 B2 * | 5/2012 | Cho | ..................... | A01K 27/002 119/792 |
| D688,011 S | 8/2013 | Gee | | |

(Continued)

FOREIGN PATENT DOCUMENTS

| | | | | |
|---|---|---|---|---|
| DE | 202015106927 U1 * | 3/2016 | ........... | A01K 27/002 |
| EP | 3262928 A1 | 1/2018 | | |
| JP | 3204215 U | 5/2016 | | |

OTHER PUBLICATIONS

Big & Little Dogs | Reversible Dog Harness for Big & Small Dogs | <https:bigandlittledogs.com/collections/reversible-harnesses>; printed document on Oct. 23, 2018; 8 pages.

(Continued)

*Primary Examiner* — Kristen C Hayes
(74) *Attorney, Agent, or Firm* — Hanrahan Law Firm, P.A.; Benjamin M. Hanrahan

(57) ABSTRACT

A reversible dog harness that includes a swiveling front D-ring that is operable and accessible regardless of whether the harness is positioned in a first reversible orientation or a second reversible orientation. For instance, the harness includes a body has a first side and a second side, the first and second sides being opposite one another. The first side is facing in an outward direction when the body is disposed in a first reversible orientation, whereas the second side is facing outward when the body is disposed in a second reversed orientation. A mounting member is attached to the body and defines a loop that extends beyond an adjacent edge of the body. A portion of the D-ring is be disposed within the loop such that the connector is disposed adjacent the edge and off of the body.

12 Claims, 14 Drawing Sheets

(56) References Cited

U.S. PATENT DOCUMENTS

| | | | |
|---|---|---|---|
| 8,807,091 B2 * | 8/2014 | Min | A01K 27/002 119/856 |
| RE45,674 E | 9/2015 | Evans | |
| D779,738 S | 2/2017 | Chow et al. | |
| D862,002 S | 10/2019 | Wu | |
| D862,803 S * | 10/2019 | Yun | D30/152 |
| D883,581 S * | 5/2020 | Daly | D30/152 |
| 2002/0053324 A1 | 5/2002 | Kato | |
| 2006/0102102 A1 | 5/2006 | Bennett et al. | |
| 2008/0223311 A1 | 9/2008 | Ito | |
| 2010/0116221 A1 * | 5/2010 | Falcon-Labry | A01K 27/003 119/792 |
| 2010/0263602 A1 * | 10/2010 | Cho | A01K 27/002 119/792 |
| 2011/0067648 A1 | 3/2011 | Siklosi et al. | |
| 2011/0271913 A1 * | 11/2011 | Min | A01K 27/002 119/856 |
| 2013/0128556 A1 | 5/2013 | Brauser et al. | |
| 2014/0202398 A1 | 7/2014 | Woodward et al. | |
| 2017/0290300 A1 | 10/2017 | Vaccari | |

OTHER PUBLICATIONS

Big & Little Dogs | Reversible Dog Harnesses for Big & Small Dogs | <https://bigandlittledogs.com/collections/reversible-harnesses/products/reversible-dog-harness-ladybug> ; printed document on Oct. 23, 2018; 21 pages.

Karen Pryor Clicker Training | Balance No-Pull Harness, tiny | <https://shop.clickertraining.com/producs/balance-harness> | printed document on Oct. 23, 2018; 3 pages.

Kurgo | Enhanced Strength Tru-Fit Dog Car Harness | https://www.kurgo.com/dog-harnesses/enhanced-strength-dog-car-harness/>; Printed document on Oct. 23, 2018; 3 pages.

Kurgo | Journey Air Dog Harness | <https://kurgo.com/dog-harnesses/journey-air-dog-harness/>; printed document on Oct. 23, 2018; 3 pages.

Moo+Twig | Reversible Dog Harness—Peek-A-Moo | <https://www.mooandtwig.com/products/reversible-harness-peek-a-moo>; printed document on Oct. 23, 2018; 2 pages.

Moo+Twig | Reversible Dog Harness—Snack Attack | <https://mooandtwig.com/collections/dog-harnesses/products/reversible-dog-harness-snack-attack>; printed document on Oct. 23, 2018; 2 pages.

Pawsitivity | Pawsitivity Reversible Dog Harness | <https://spreadpawsitivity.com/collections/pawsitivity-reversible-dog-harnesses> ; printed document on Oct. 23, 2018; 6 pages.

Petbaba | Petbaba No Pull Dog Harness | Published on Amazon.com; <https://www.amazon.com/PETBABA-Reflective-Martingale-Suitable-Controlling/dp/B074487H41?th=1>; printed document on Oct. 23, 2018; 8 pages.

"Coastal Comfort Soft Adjustable Dog Harness" | cited by Examiner in U.S. Appl. No. 29/691,450 | <https://www.amazon.com/Coastal-Comfort-Soft-Adjustable-Harness/dp/B0027JAPWA/ref=cm_cr_arp_d_product_top?le=UTF8> }date unknown.

"Dexil: Elite Range Non-Pull Harness" | cited by Examiner in U.S. Appl. No. 29/691,450 | <https://www.amazon.co.uk/Dexil-Waterproof-Adjustable-Non-Pull-Licorce/dp/B019OT0CZ0/ref-sr_1_48?> | dated Mar. 9, 2021 and Dec. 22, 2015.

"Frenchie Bulldog: Duo Reversible Harness" | cited by Examiner in U.S. Appl. No. 29/691,450 | <https://web.archive.org/web/20161212115228/https://frenchiebulldog.com/collections/the-new-frenchie-reversible-harness> | dated Dec. 12, 2016.

"Gooby Freedom Dog Harness II—Purple" | cited by Examiner in U.S. Appl. No. 29/691,450 | <https://www.baxterboo.com/p.cfm/gooby-freedom-dog-harness-2-purple> | date unknown.

\* cited by examiner

REVERSIBLE DOG HARNESS WITH MULTIPLE LEASH CONNECTORS

CLAIM OF PRIORITY/CROSS-REFERENCE TO RELATED APPLICATION

The present application is based on and a claim of priority is made under 35 U.S.C. § 119(e) to provisional patent application Ser. No. 62/747,155, filed on Oct. 18, 2018, the content of which is incorporated herein in its entirety by reference.

The present application is also a continuation-in-part of previously filed, currently pending U.S. design patent application Serial No. 29/691,450 filed on May 16, 2019.

FIELD OF THE INVENTION

The present invention is generally directed to a dog harness, and more specifically, a reversible dog harness that includes a top leash connector or swiveling D-ring and a front leash connector or swiveling D-ring.

BACKGROUND OF THE INVENTION

Dog or pet harnesses are well known and generally include a series of straps that loop around the dog's torso and secure with one or more buckles. Reversible harnesses provide dog or pet owners the ability to selectively manipulate the harness, for example, by reversing all or some of the harness, in order to display different patterns, colors, etc. Although reversible harnesses can provide different fashionable options, they also create a challenge in providing a number of functional features.

For example, if the harness is reversible, it may be undesirable to have metal or plastic clips, rings, brackets, or other typically hard pieces of the harness in places that would or could be pressed directly against the body of the pet or dog. In other words, if the harness has metal, plastic or other rigid clips, brackets, clasps, D-rings, O-rings, etc. on one or both of the decorative surfaces of the reversible harness, then when that surface is turned to face the inside of the harness, those rigid clips, brackets, clasps, or rings will press directly against the dog. This will not only be extremely uncomfortable for the dog, but in cases where the dog may have difficulty breathing (e.g., after surgery or after an injury), it can be physically detrimental to the dog or pet.

Accordingly, there is a need in the art for a reversible harness that that includes a swiveling D-ring or other leash connector on the front edge of harness's collar portion. The location of the front connector and the ability of the connector to swivel will allow it to be used when the harness in disposed in either or both of the two reversible orientations. The front connector can swivel into position and is kept from pressing against the dog's body. The proposed reversible harness can also include a top connector or top D-ring, which also swivels and which can be used when the harness is disposed in either or both of the two reversible orientation. Similarly, the top connector can swivel into position and is kept from pressing against the dog's body.

SUMMARY OF THE INVENTION

The present invention is directed to a reversible dog harness, that includes a front connector, which may be in the form of a D-ring, that swivels and is operable and accessible regardless of whether the harness is positioned in a first reversible orientation or a second reversible orientation.

For instance, the harness includes a body that defines a collar portion and a chest portion. The body has a first side and a second side, the first and second sides being opposite one another. For example, the first side may be facing in an outward direction when the body is disposed in a first reversible orientation, whereas the second side may be facing outward when the body is disposed in a second reversed orientation. Conversely, the second side will be facing inward when the body is in the first reversed orientation and the first side will be facing inward when the body is disposed in the second reversed orientation.

In some embodiments, the first side will have a different color, pattern or indicia than the second side, which allows a pet owner to choose which one of the sides to display. It should be noted that the term side, used in first side and second side, can include portions of an outer brim or raised edge.

In addition, a mounting member is attached to the body in a manner to define a loop. At least a portion of the loop extends outward or beyond an adjacent edge, such as a front edge, of the body. A portion of the front connector or D-ring (e.g., the flat portion of a D-ring) can be disposed within this loop such that the connector is disposed adjacent the edge and off of the body. This allows the connector to advantageously swivel or move in a manner such that it is accessible and operable regardless of which one of the two reversed orientations the body is positioned.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
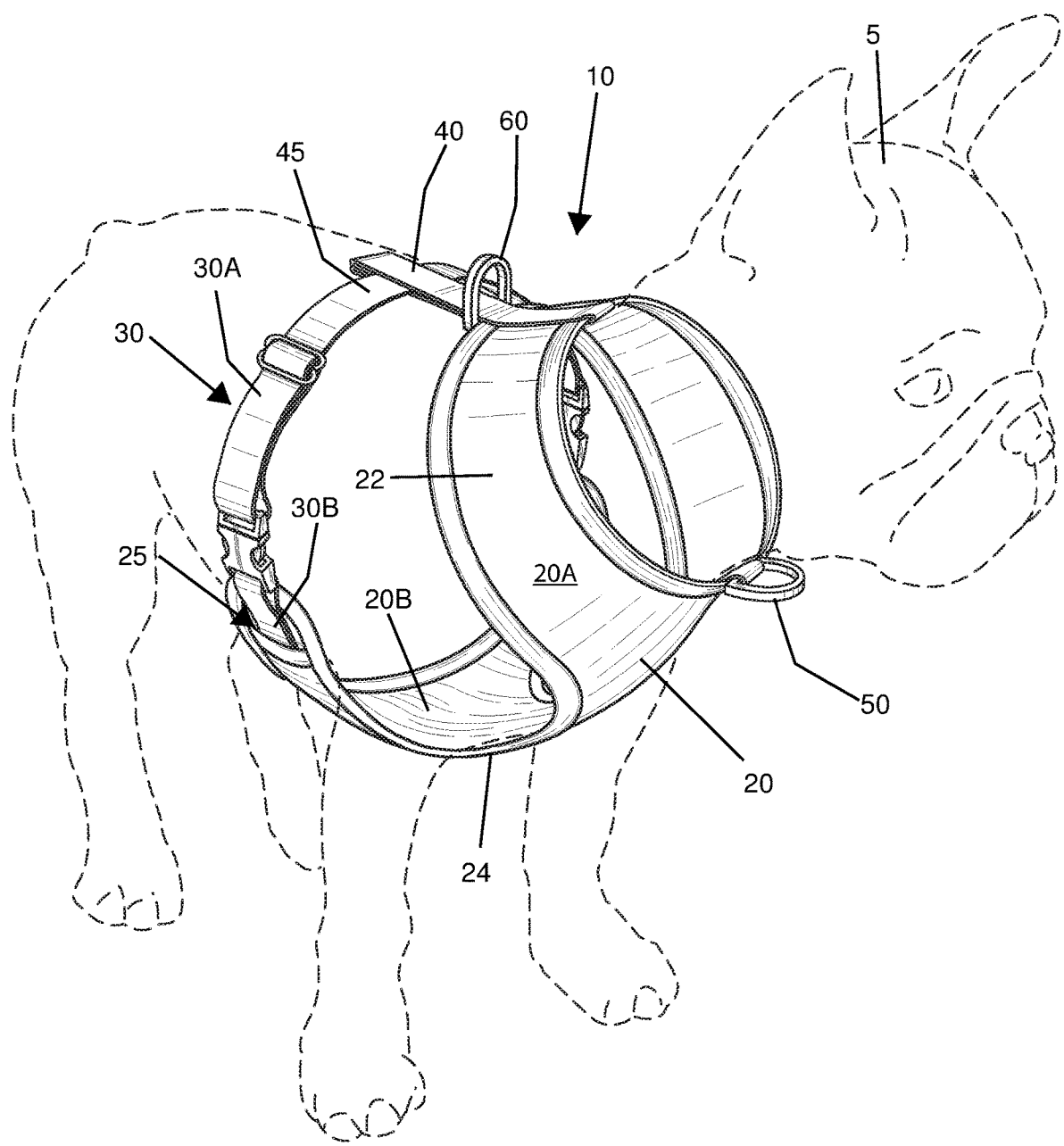
FIG. 1 is a perspective view of the dog harness as disclosed in accordance with at least one embodiment of the present invention while being worn by a dog.
Figure 2:
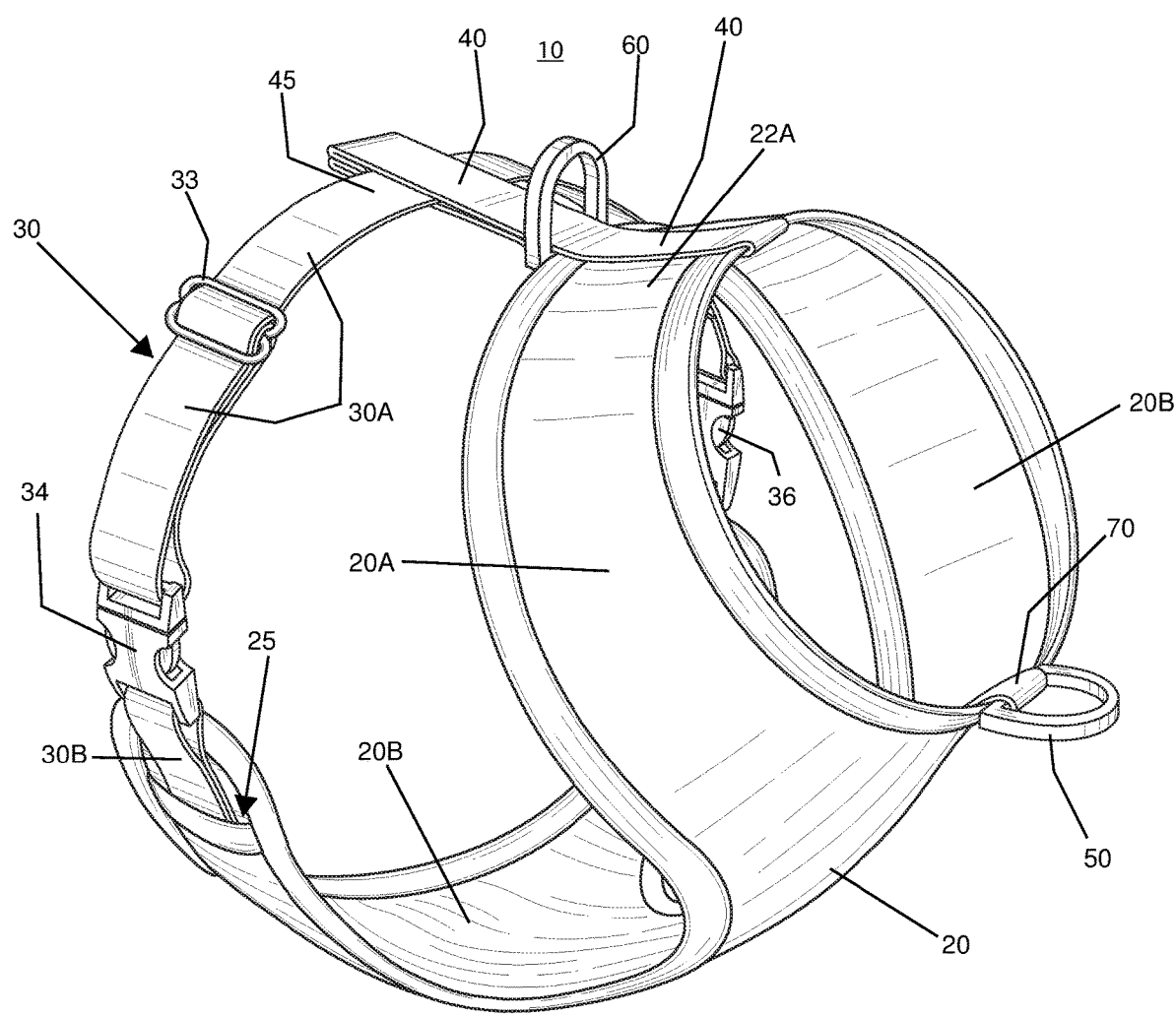
FIG. 2 is a front-left perspective view of the dog harness as disclosed in accordance with at least one embodiment of the present invention.

As shown in the accompanying drawings, and with particular reference to FIG. 1, the present invention is directed to a harness, referenced as 10, and more specifically, to a reversible dog harness 10 that includes leash connectors (e.g., D-rings or O-rings) 50, 60 strategically placed and operable in a way such that the connectors 50, 60 can be used or accessed regardless of which reversible orientation the harness is positioned. Additionally, the connectors 50, 60 do not press directly against the animal's 5 body and are thus not obtrusive, uncomfortable or detrimental to the animal 5.

Figure 11:
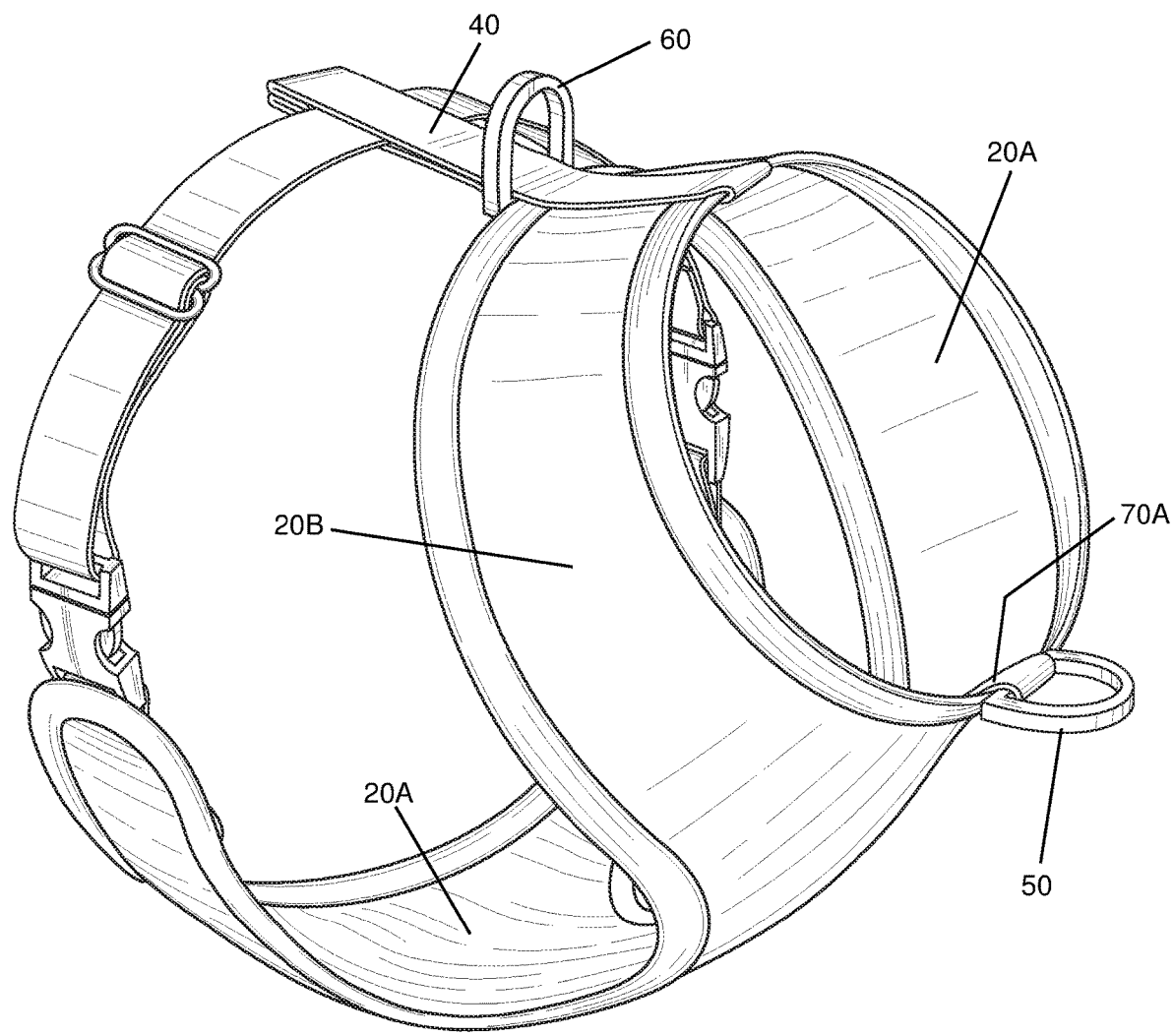
FIG. 11 is a perspective view of the embodiment illustrated in FIG. 2-8, although disposed in a reversed orientation relative thereto.
Figure 12:
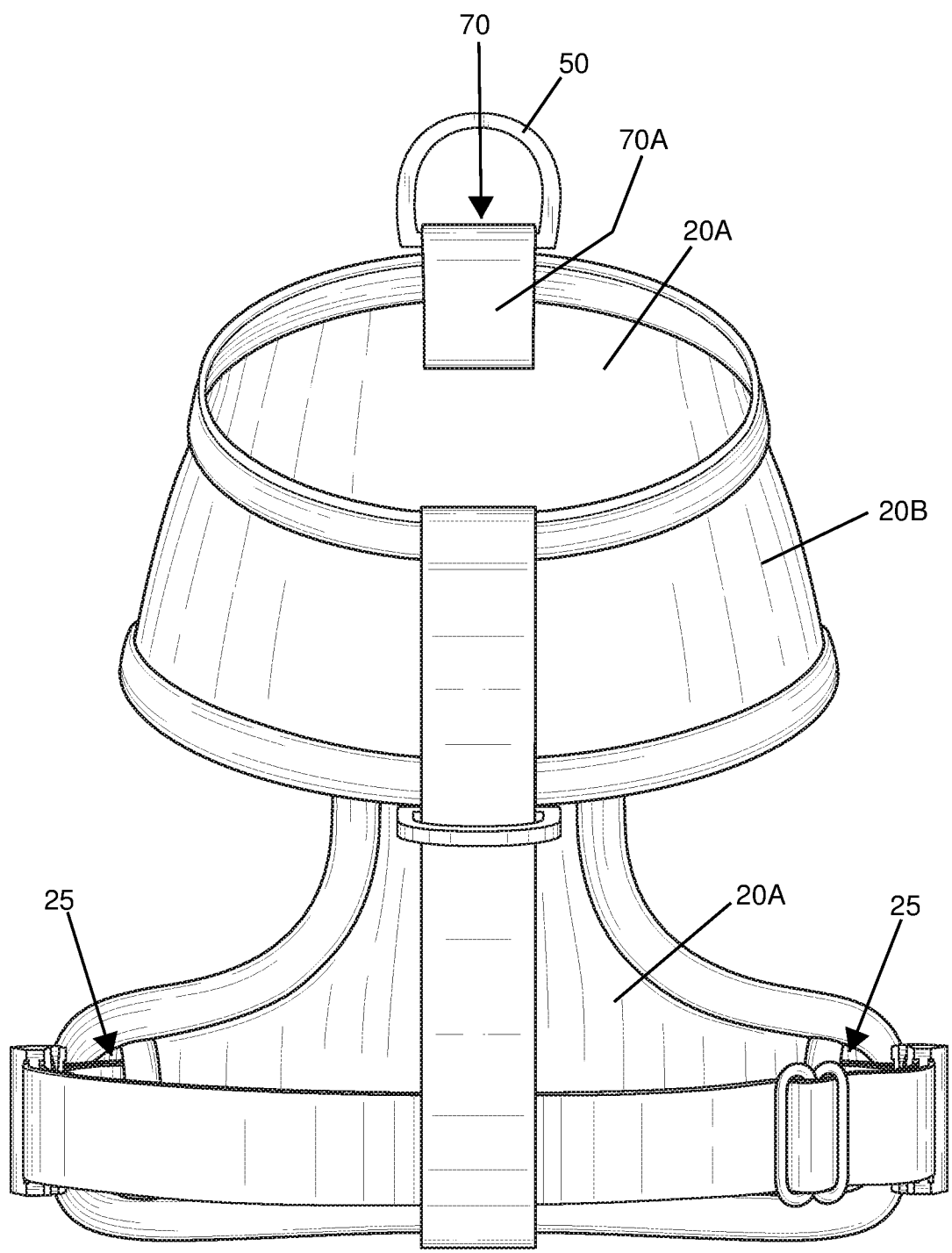
FIG. 12. is a top view of the dog harness illustrated in FIG. 11.

Particularly, and still referring to FIG. 1, as well as FIGS. 2 through 8, the harness 10 includes a body 20 that includes a first side 20A and a second side 20B. The body 20 of the harness 10 of at least one embodiment is made of a fabric or textile material, although other materials are contemplated. The body 20 of at least one embodiment is reversible, meaning that, when the body 20 is positioned in a first orientation (FIGS. 1-8), the first side or surface 20A is facing outward while the second side or surface 20B is facing inward, and when the body 20 is positioned in a second orientation (FIGS. 11 and 12), the second side or surface 20B is facing outward while the first side or surface 20A is facing inward.

In some embodiments, the first side or surface 20A will have a different color, pattern or indicia than the second side or surface 20B. In those cases, a pet owner can position the body 20 in the first orientation when it is desired to display the color, pattern or indicia on the first side or surface 20A, and position the body 20 in the second orientation when it is desired to display the color, pattern or indicia on the second side or surface 20B. It should be noted that other embodiments may have the same or similar colors, patterns, or indicia on both the first and second sides or surfaces 20A, 2B and still be considered reversible within the spirit and scope of the present invention.

Furthermore, still referring to FIG. 1, the body 20 can be defined as including a collar portion 22 and a chest portion 24. The collar portion 22, as used herein, is the area or portion of the body that substantially surrounds the neck area of the animal, whereas, the chest portion 24 is the area or portion of the body 20 that is adjacent or at least partially covers the animal's chest. The collar portion 22 defines an opening through which the animal's head is placed until the collar portion surrounds the animal's neck, as shown in FIG. 1. The chest portion 24 is then placed over the animal's chest, as shown in FIG. 1, and one or more straps, such as rear straps, are secured or connected, for example, via cooperative buckle assemblies.

Additionally, the body 20 of at least one embodiment includes a channel 25 or opening though which a portion of a rear strap 30 is disposed. Specifically, in at least one embodiment, the channel 25 of the body 20 is a continuous opening or channel that extends laterally across the body 20 of the harness 10 with openings at each side or end. A portion of the rear strap 40 is fed or disposed through the channel 25, as described in more detail below.

For instance, the rear strap 30 of at least one embodiment includes a first portion 30A and a second portion 30B. The second portion 30B is at least partially fed or disposed through the channel 25 of the body 20. In this manner, the second portion 30B of the rear strap 30 will secure the body 20 of the harness 10 against the bottom of the animal's chest or against the animal's stomach, depending on the size of the animal or harness.

In some embodiments, the second portion 30B of the rear strap 30 can be completely disconnected from the first portion 30A via two separate buckle assemblies 34, 36 or other connectors, attachment mechanisms, etc. Accordingly, with the second portion 30B of the rear strap 30 fed through or otherwise positioned within the channel 25, two free ends of the second portion 30B will extend beyond the channel 25, as shown in the Figures. Buckle attachments are secured to the two free ends, which connect to cooperative buckle attachments secured to the two free ends of the first portion 30A of the rear strap 30.

Additionally, in at least one embodiment, a top strap 40 extends rearwardly from the collar portion 22 of the body 20. In the embodiment shown in FIGS. 1 through 8, the harness 10 includes one top strap 40 extending rearward from the top of the collar portion 22. However, other embodiments may have multiple top straps 40, or one top strap 40 not necessarily extending from top of the collar portion 22.

Figure 3:
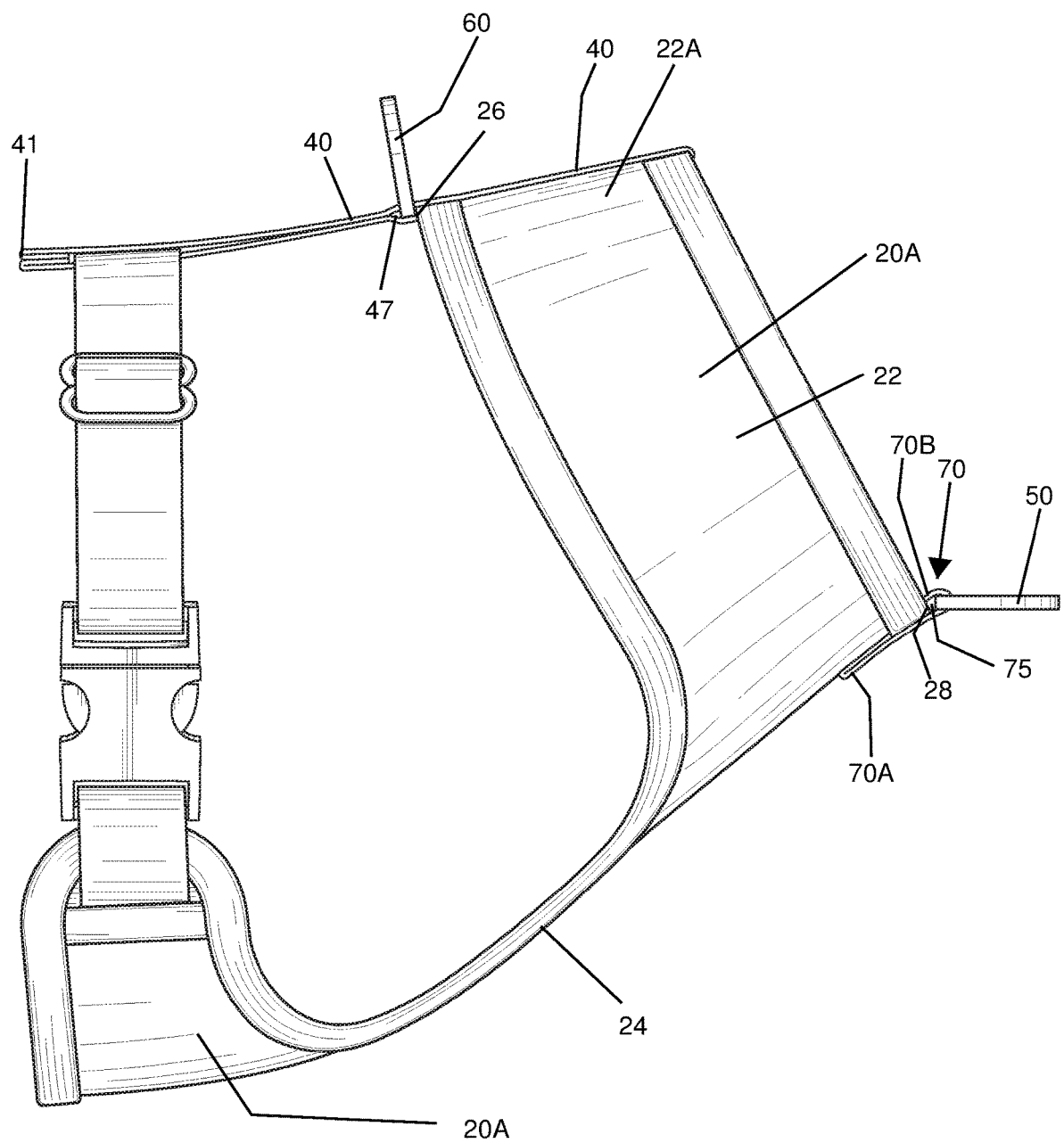
FIG. 3 is a left-side view of the dog harness illustrated in FIG. 2.
Figure 4:
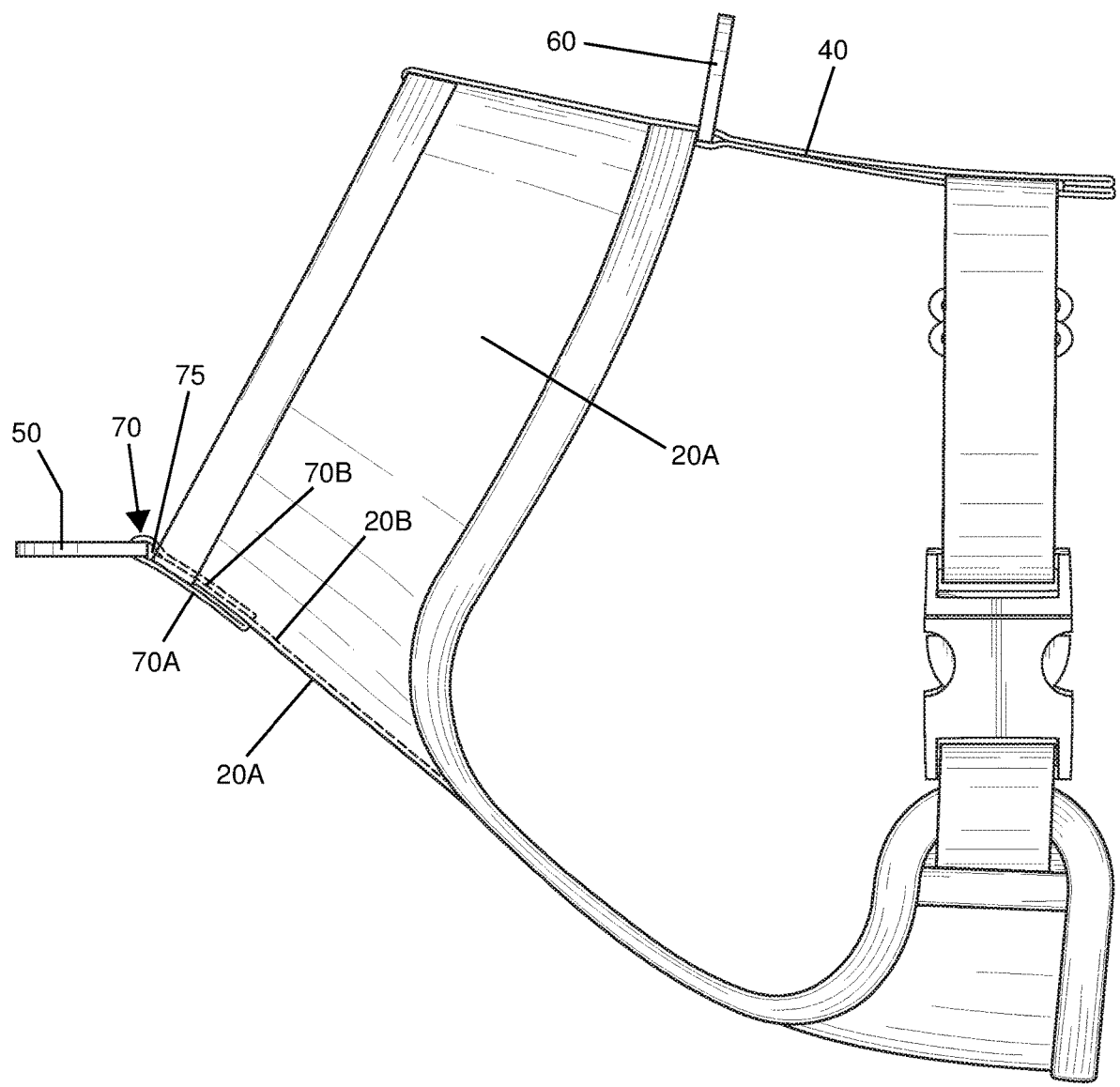
FIG. 4 is a right-side view of the dog harness illustrated in FIGS. 2 and 3, with a portion of the mounting member visible through the body via phantom lines.
Figure 5:
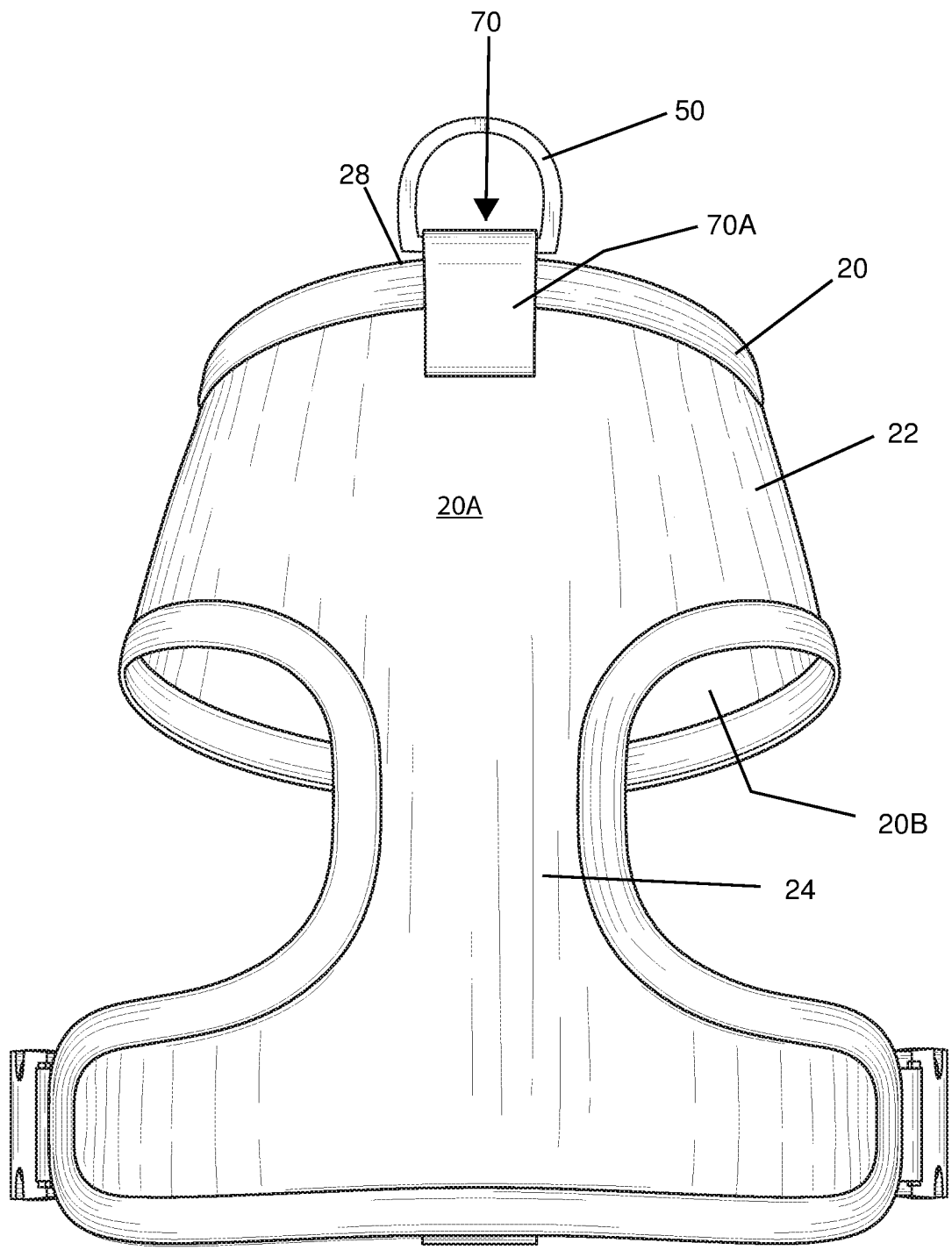
FIG. 5 is a bottom view of the dog harness illustrated in FIGS. 2-4.
Figure 6:
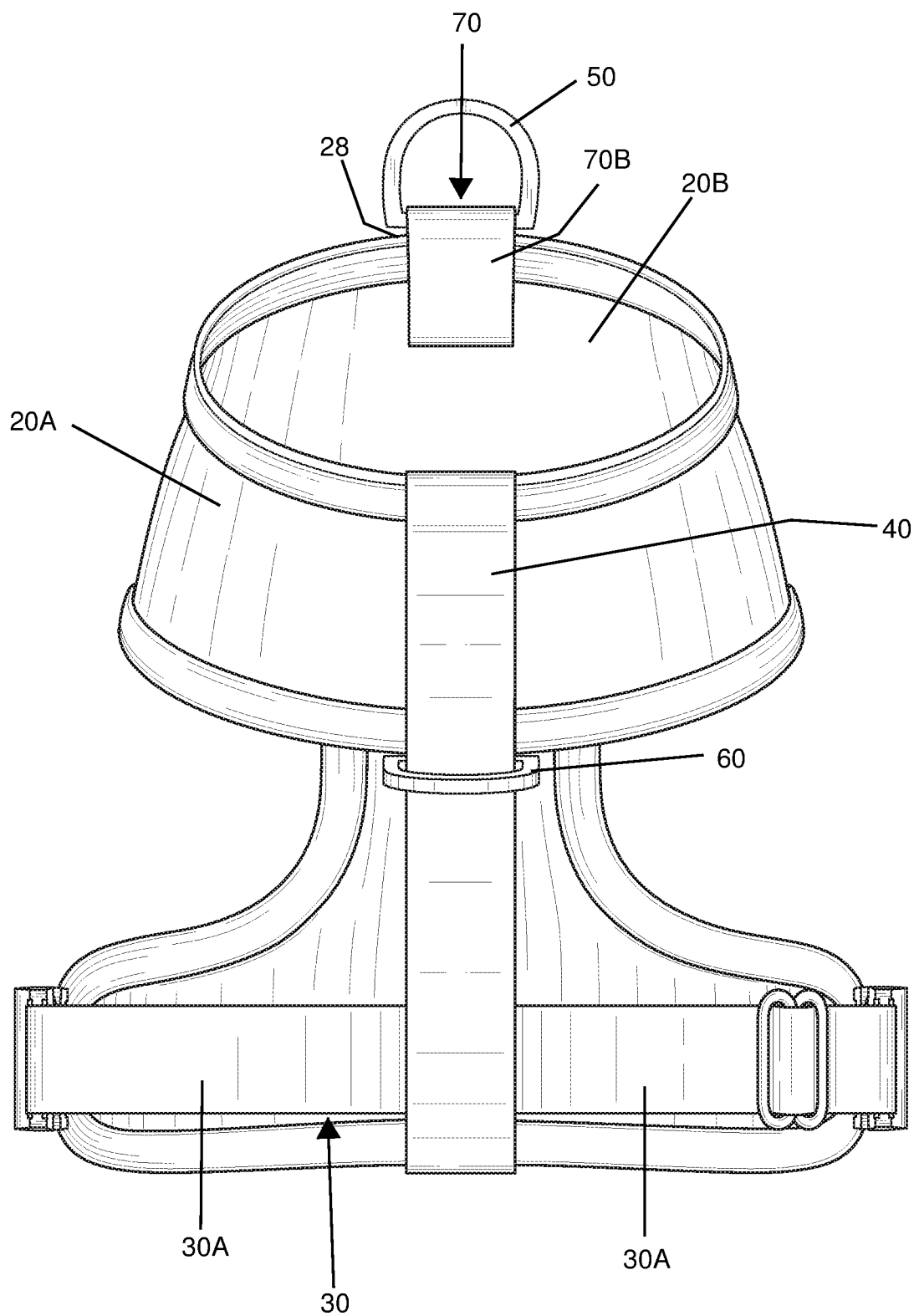
FIG. 6 is a top view of the dog harness illustrated in FIGS. 2-5.
Figure 7:
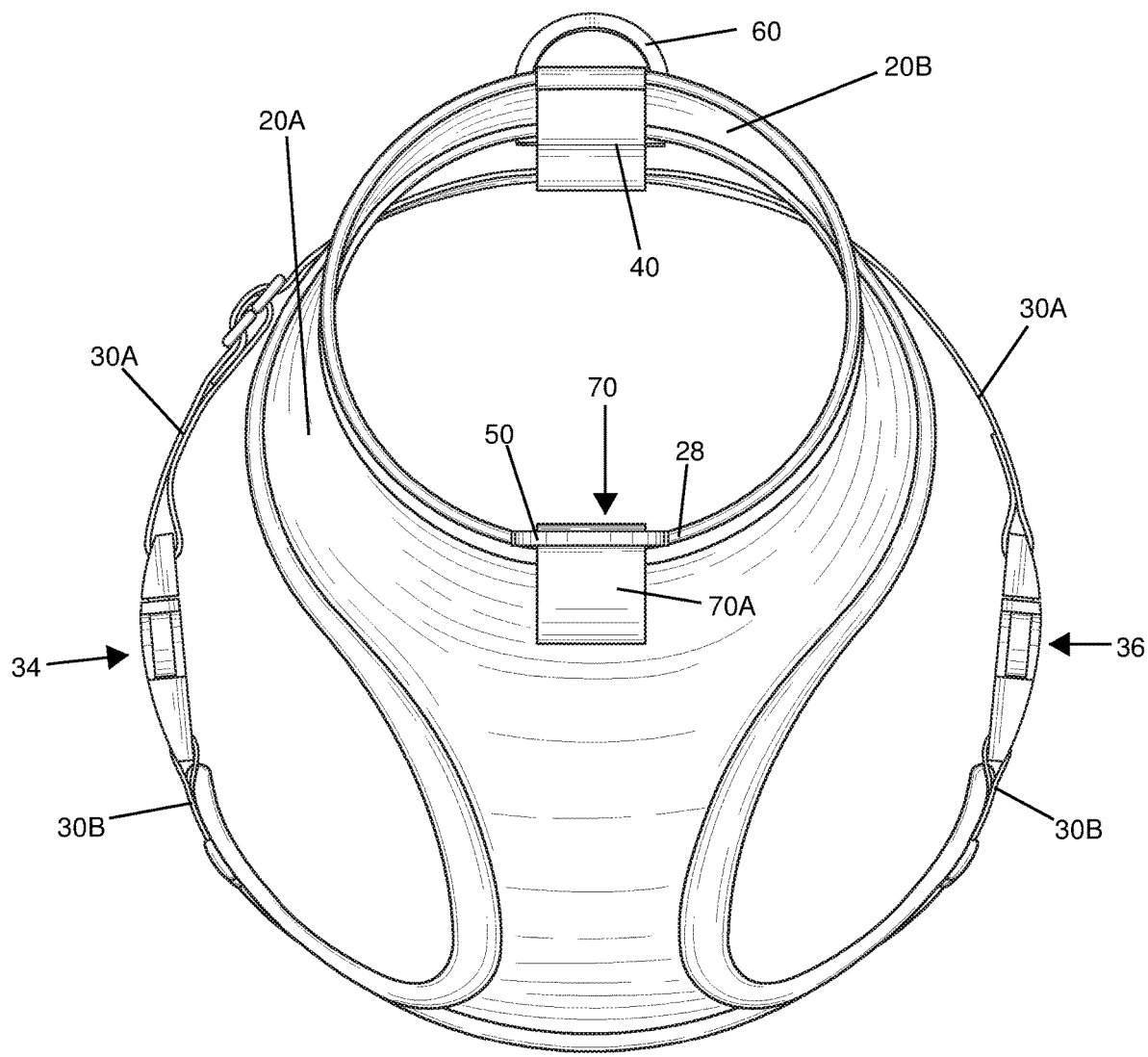
FIG. 7 is a front view of the dog harness illustrated in FIGS. 2-6.
Figure 8:
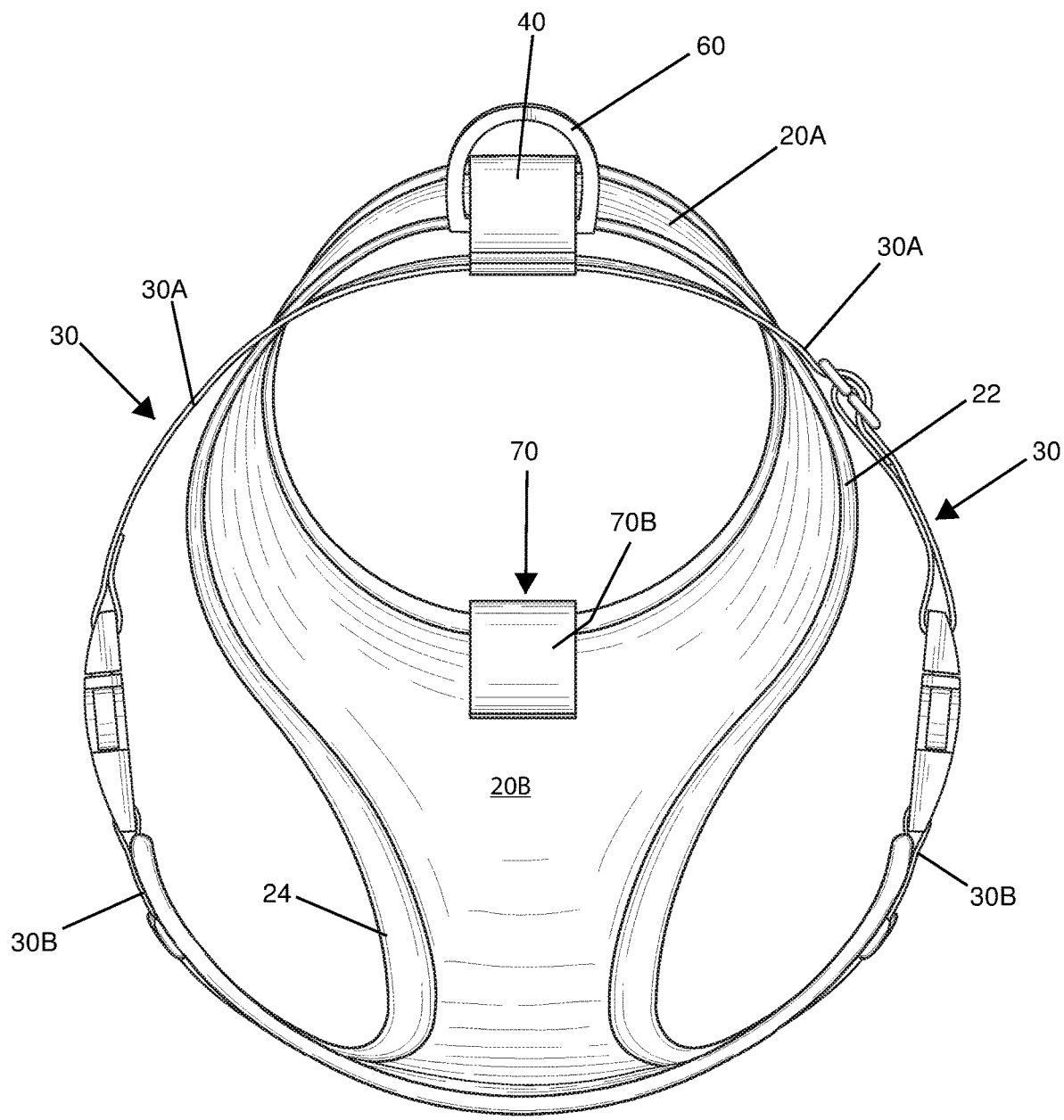
FIG. 8 is a rear view of the dog harness illustrated in FIGS. 2-7.

The top strap 40, of at least one embodiment, forms a loop 45 through which the rear strap 30, and in particular, the first portion 30A of the rear strap 30, is disposed. For example, the top strap 40 may be formed of two strips of material connected in a manner to form the loop 45. Specifically, as shown in FIG. 3, for example, the two strips may be connected together at one end 41 and again at another point 43 along the length of the strips to form the loop 45. The strips or top strap of one embodiment is also connected or attached to the body 20, and. In particular to the collar portion thereof.

In some cases, the top strap may be a single strip of material that is folded upon itself and/or connected to itself to form a loop 45. Other embodiments may have different configurations to form the loop 45 through which the rear strap 30 is disposed.

Furthermore, in at least one embodiment, a top connector 60 is provided and attached to the harness 10 at or near the top 22A of the collar portion 22. For instance, the top connector 60 may include or otherwise be in the form of a D-ring (a ring shaped similar to the letter D), an O-ring (a ring shaped similar to the letter O) or other like connector or device. Specifically, the connector 60 is used to connect a leash, rope, etc. (not shown) to the harness 10. Specifically, it is common to have a snap-connector, quick connect coupler, hook, carabiner, or other like connector at the end of a leash (not shown) that can connect to the top connector 60 of the present invention.

Furthermore, in at least one embedment, and as shown in FIG. 3, for example, the top connector 60 is attached to the harness 10 in a manner that allows it to swivel into multiple positions such that the top connector 60 can be operable regardless of which one of the two reversible orientations the body 20 is positioned. For example, when the body 20 is positioned in the first orientation (FIGS. 1-8), the top connector 60 can be swiveled or positioned such that the opening defined by the top connector 60 can extend upward or beyond the first surface 20A (which is the outward facing surface in this orientation) of the body 20. Similarly, when the body 20 is positioned in the second orientation (FIGS. 11, 12), the top connector 60 can be swiveled or positioned such that the opening defined by the top connector 60 can extend upward or beyond the second surface 20B (which is the outward facing surface in this orientation) of the body 20.

Specifically, with reference again to FIG. 3, the top connector 60 is attached or connected to the harness 10 adjacent the rear edge 26 of the top 22A of the collar portion 22. In other words, the top harness 60 of at least one embodiment is not attached to the first surface 22A or second surface 22B of the body 20. Rather, the top connector 60 is disposed adjacent the edge 26. This allows the top connector to swivel into the different positions, as described herein.

In at least one embodiment, the top strap 40 forms a loop 47 or opening that is disposed off of the edge of the body 20 and/or that extends off of the edge of the body 20. A portion of the top connector 60 is disposed within the loop 47, allowing the top connector to swivel. For example, one portion of the top strap 40 may be connected to the first surface 20A of the body 20 and another portion of the top strap 40 may be connected to the second surface 20B. As those portions of the top strap extend off of the body 20 and are connected at point 43, a loop 47 is formed. There are other ways, within the full spirit and scope of the present invention to form the loop 47 extending or disposed off of edge 26.

Further, at least one embodiment of the present invention also includes a front connector 50 extending off of a front edge 28. For instance, the front edge 28 defines the opening of the collar portion 22 of the body 20 through which the animal's head is positioned. In at least one embodiment, the front connector 50 may be disposed at or near the bottom of the front edge 28, which may be near the animal's throat or neck.

The front connector 60 may include or otherwise be in the form of a D-ring (a ring shaped similar to the letter D), an O-ring (a ring shaped similar to the letter O) or other like connector or device. Specifically, the front connector 50 may be used to connect a leash, rope, etc. to the harness 10 via a cooperative hook or connector (not shown).

Furthermore, in at least one embedment, the front connector 50 is attached to the harness 10 in a manner that allows it to swivel into multiple positions such that the front connector 50 can be operable regardless of which one of the two reversible orientations the body 20 is positioned. For example, when the body 20 is positioned in the first orientation (FIGS. 1-8), the front connector 60 can be swiveled or positioned such that the opening defined by the top connector 60 is accessible with the second surface 20B directly against the animal's body and the first surface 20A positioned outward. Similarly, when the body 20 is positioned in the second orientation (FIGS. 11, 12), the front connector 50 is accessible with the first surface 20A directly against the animal's body and the second surface 20B positioned outward.

For instance, in at least one embodiment, a mounting piece or member 70 is used to connect or mount the front connector 50 to the harness 10. As shown in FIGS. 1-8, the mounting piece or member 70 is an elongated strip of material connected to the body 20 (e.g., via stitching, adhesive, etc.) and defining a loop 75. The loop 75 of at least one embodiment extends off of the edge 28 of the body 20. In this manner, a portion of the front connector 50 can be disposed within the loop 75 such that the front connector 50 is disposed adjacent or in front of the edge 28. This allows the front connector 50 to swivel up and down (in the orientation of FIG. 3) in order to be operable when the body 20 is positioned in the first reversible orientation and the second reversible orientation.

With reference to FIGS. 1-8, the mounting piece or member 70 may be an elongated piece of material or structure that includes at least a first portion 70A and a second portion 70B that are folded in order to form the loop 75. The first portion 70A may be attached (e.g., via stitching, adhesive, etc.) to the first side or surface 20A of the body 20. Similarly, the second portion 70B may be attached to the second side or surface 20B of the body. This allows at least a portion of the loop 75 to extend outward and beyond the edge 28. In some cases, the edge 28 may define an inside edge of the loop or it may be within the loop 75, for example, depending on how far back from the edge 28 the first and second portions 70A, 70B are sewn or attached.

Either way, at least a portion of the loop 75 extends forward or beyond the edge 28, allowing the front connector 50 to swivel into different positions and to be accessible and operable when the body 20 is disposed in the first reversible orientation and the second reversible orientation.

Figure 9:
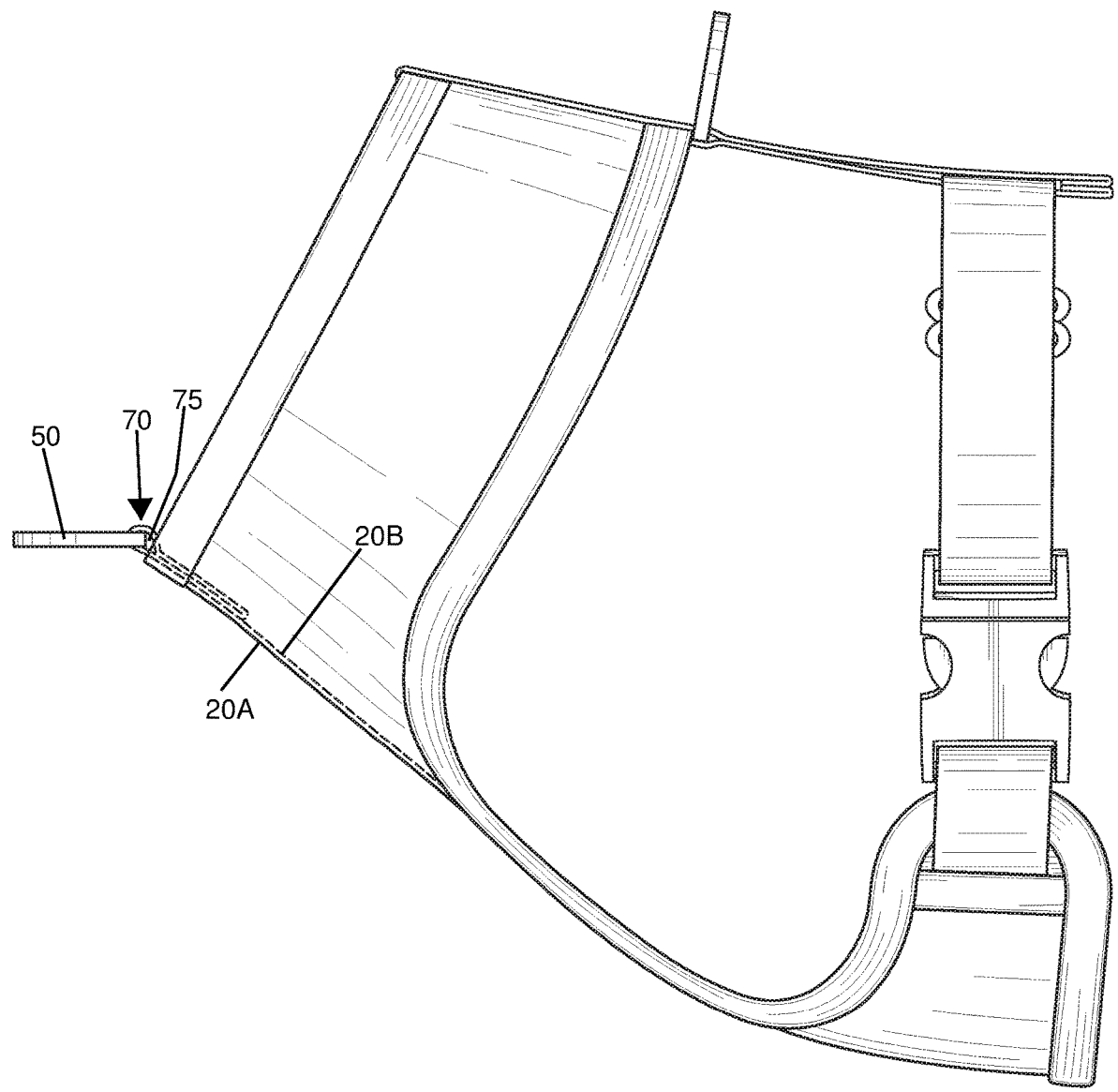
FIG. 9 is a side view of another embodiment of the dog harness with portions of the mounting member visible through the body via phantom lines.
Figure 10:
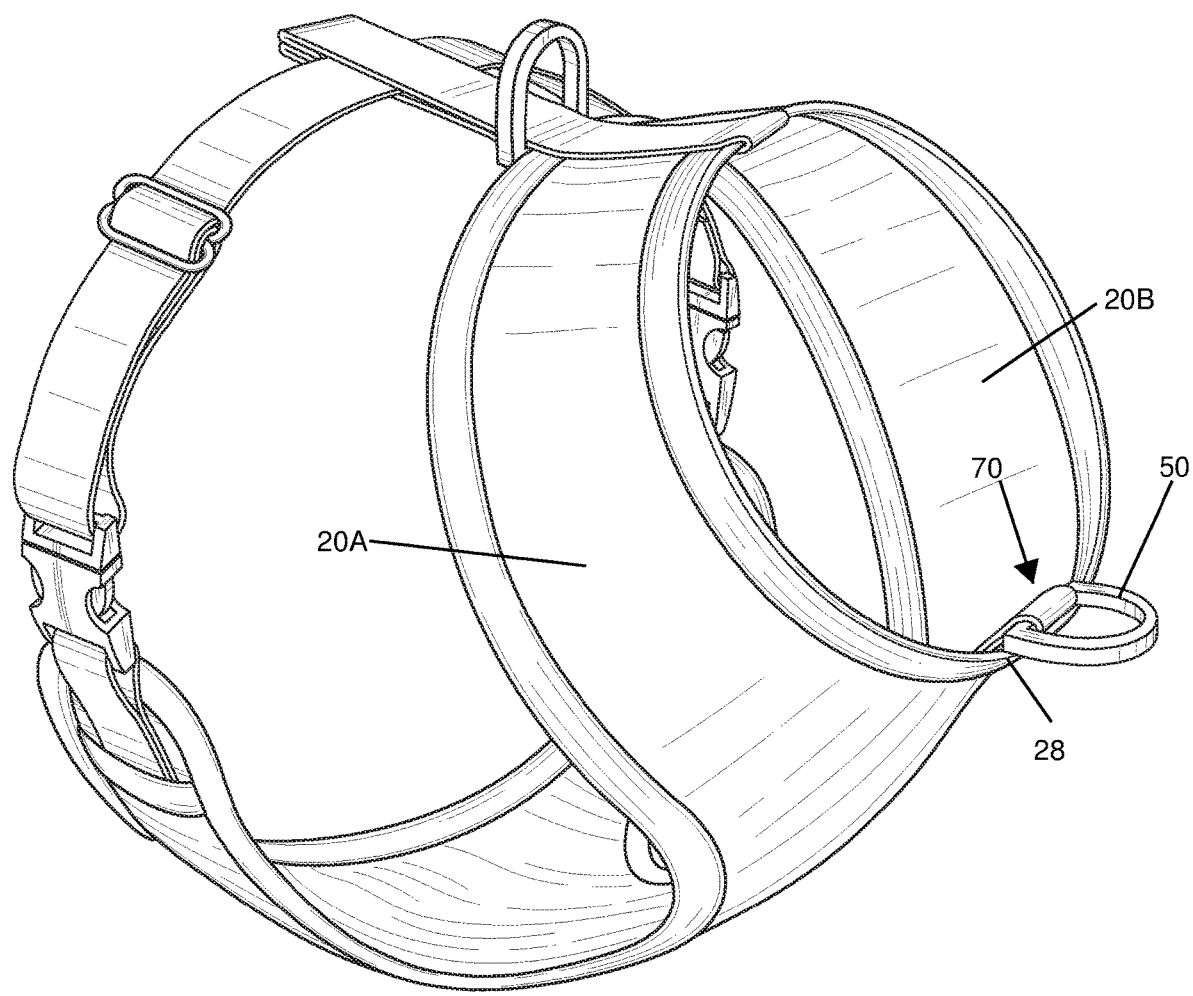
FIG. 10 is a perspective view of the embodiment illustrated in FIG. 9.

In another embodiment, the mounting piece or member 70 may be attached to or disposed against only one of the two sides or surfaces 20A, 20B, as shown in FIGS. 9 and 10, for example. Specifically, in this embodiment, even though the mounting piece or member 70 is attached to only one side (e.g., side 20A), at least a portion of the loop 75 still extends beyond or forward of the front edge 28, allowing the front connector to swivel and be operable regardless of which one of the two reversible orientations the body is positioned.

It should also be noted that while the mounting member 70 is shown in FIGS. 9 and 10 as being attached to or disposed against the second surface or side 20B of the body and not against the first surface 20A, the reverse construction can also be made. In other words, it is contemplated that the mounting member 70 can be attached to or disposed against the first surface 20A and not to or against the second surface or side 20B.

It should also be noted that the mounting piece or member 70 of at least one embodiment can be a single piece, multiple pieces or integral with the body 20. Furthermore, the mounting piece or member 70 can be formed of a textile or fabric material, or in other embodiments, the mounting piece or member may be more rigid, and, for example, constructed of plastic, rubber, metal, etc.

Figure 13:
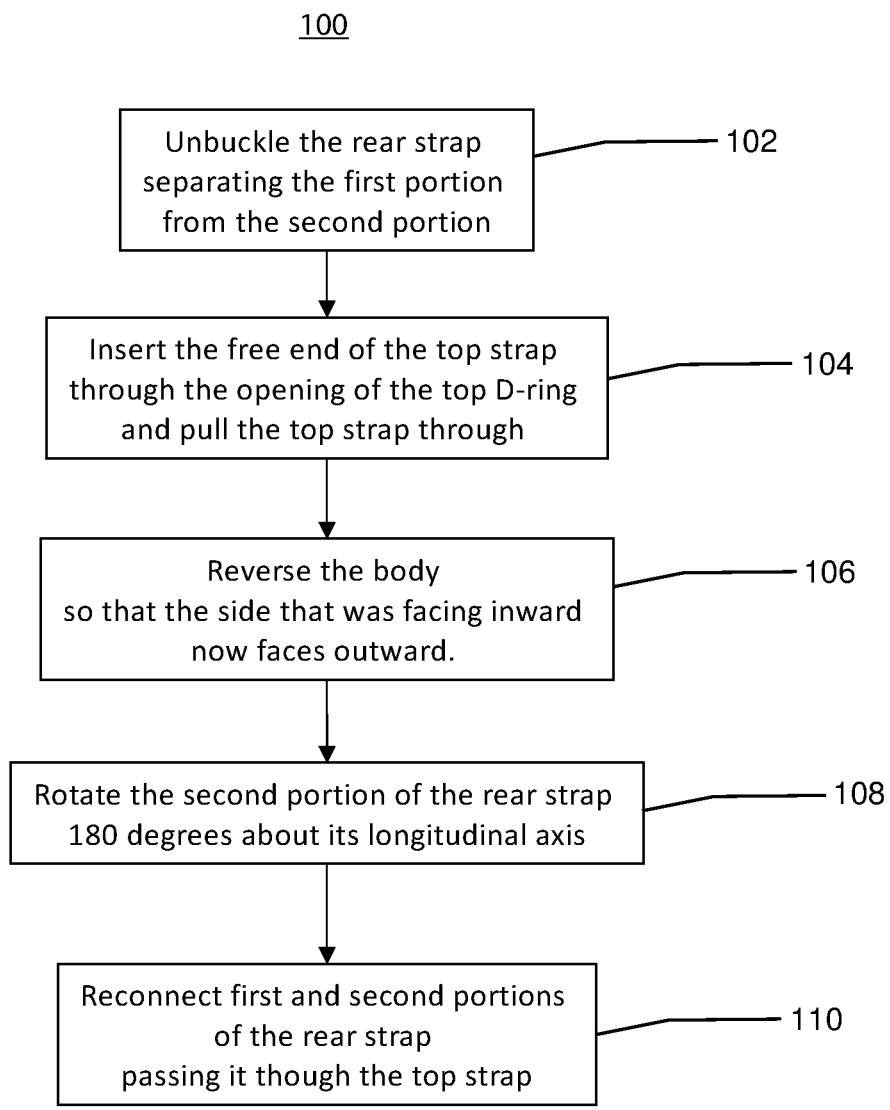
FIG. 13 is a flow chart illustrating the method of reversing the dog harness of at least one embodiment of the present invention.
Figure 14:
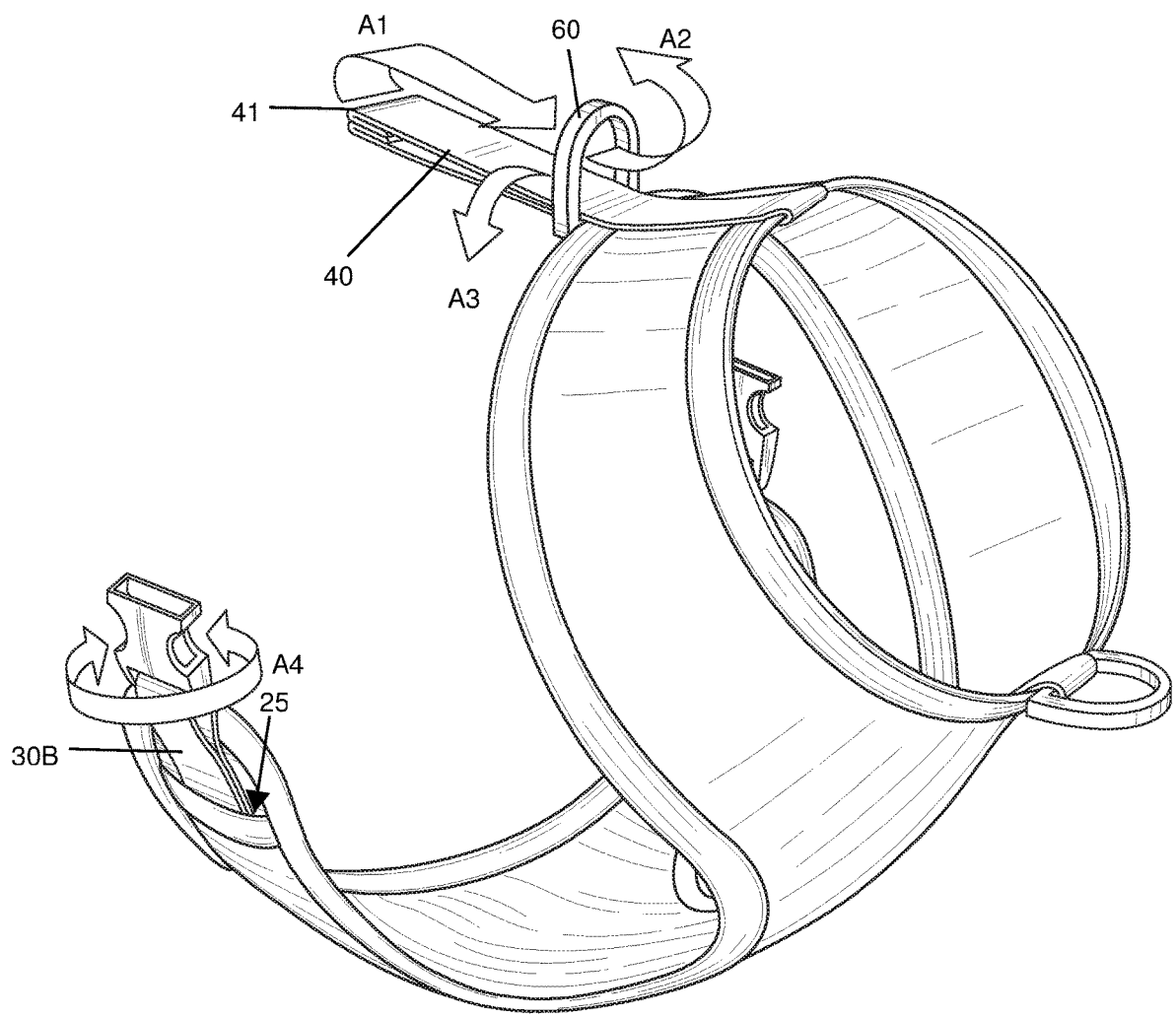
FIG. 14 is a perspective view of the dog harness without the first portion of the rear strap and with directional arrows to illustrate the method of reversing the dog harness.

With reference now to FIGS. 13 and 14, a method 100 of reversing the harness 10 is shown. For example, with the first portion 30A of the rear strap 30 removed from the second portion 30B and/or otherwise removed from the loop 45, as referenced at 102, the top strap 40 can be inserted through the top connector 60 as shown by arrows A1 and A2 in FIG. 14. For example, the outermost end 41 of the top strap 40 is fed through the connector 60 and pulled all the way through. This will allow the top connector 60 to swivel down, as shown by arrow A3 in FIG. 14 and as represented by 104 in FIG. 13. Furthermore, as represented as 106, the body 20 of the harness 10 is also reversed or manipulated such that the second surface 20B is facing outward and the first surface 20A is facing inward.

Additionally, in some cases, the second portion 30B of the rear strap 30 can be rotated 180 degrees within the channel 25, as shown by Arrow A4. This can be done while the second portion 30B is within the channel 25 or it can be done by first removing the second portion 30B from the channel 25 and re-inserting it through the channel 25 in an opposite orientation, as exemplified by Arrow A4. This can be done in order for the buckle attachments of the first and second portions 30 to match orientations. This is because, the first portion 30A of the rear strap 30 can be used in the same orientation while the body 20 is disposed in either of the two reversed orientations, e.g., with reference to FIG. 2 (where the body 20 is disposed in the first orientation) and FIG. 11 (where the body 20 is disposed in the second orientation).

Specifically, since the rear strap 30 of at least one embodiment includes an adjustment device 33, it may be preferable to maintain the adjustment device on the outwardly facing side of the strap 30 regardless of which orientation the body 20 is positioned. For example, the adjustment device 33 can be used to adjust the length of the strap 30, and in particular, the length of the first portion 30A of the rear strap 30. It might be preferable to keep the adjustment device on the outwardly facing side of the strap 30 for purposes of accessibility and, perhaps more importantly, so the adjustment device 33 does not press directly against the body of the animal. For instance, on one side of the strap (e.g., the outwardly facing side as shown in the Figures), the adjustment device may be at least partially exposed, whereas on the other side, such as the inwardly facing side of the strap 30 shown in the Figures, the adjustment device may be protected or covered in that it will not directly contact the body of the animal.

In some cases, the corresponding buckle components on the strap 30 may connect or function properly in two different orientations. In other words, rotating the second portion 30B of the strap 180 degrees, as shown by Arrow A4, and as represented as 108, may not be necessary depending on the functionality of the particular buckle assembly.

In any event, the second portion is again fed or positioned through the opening or loop 45 and the ends of the first and second portions 30A, 30B are connected using the buckle assemblies.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A reversible dog harness, comprising:
   a body defining a collar portion and a chest portion,
   said body comprising a first side and a second side, said first side being opposite said second side, wherein said body is selectively positionable between a first orientation and a second orientation, said first orientation being defined as said first side facing outward and said second side facing inward, and said second orientation being defined as said second side facing outward and said first side facing inward,
   said body comprising a channel extending laterally through at least a part of said chest portion,
   a top strap extending rearwardly from a top of said collar portion, said top strap defining a loop,
   a rear strap disposed through said loop of said top strap and through said channel on said body,
   a top connector disposed proximate said top of said collar portion,
   a front connector disposed beyond a front edge of said collar portion of said body,
   wherein said front connector is attached to said collar portion of said body via a mounting member,
   wherein said mounting member defines a loop through which said front connector is disposed,
   wherein at least a portion of said loop of said mounting member is beyond said front edge of said body, and
   wherein a first portion of said mounting member is attached to said first side of said body and wherein a second portion of said mounting member is attached to said second side of said body.

2. The reversible dog harness as recited in claim 1 wherein said mounting member comprises an elongated strip of material.

3. The reversible dog harness as recited in claim 1 wherein said front connector comprises a ring.

4. The reversible dog harness as recited in claim 1 wherein said front connector comprises a D-ring.

5. The reversible dog harness as recited in claim 1 wherein said rear strap comprises a first portion and a second portion, said first portion being disposed through said loop of said top strap and said second portion being disposed through said channel of said body, wherein said first portion is removable from said second portion via two buckle assemblies.

6. The reversible dog harness as recited in claim 5 wherein said rear strap further comprises an adjustment device, said adjustment device being at least partially disposed on an outside-facing surface of said top strap and protected by an inside surface of said top strap when said body is disposed in said first orientation and said second orientation.

7. A reversible dog harness, comprising:
   a body defining a collar portion and a chest portion,
   said body comprising a first side and a second side, said first side being opposite said second side, wherein said body is selectively positionable between a first orientation and a second orientation, said first orientation being defined as said first side facing outward and said second side facing inward, and said second orientation being defined as said second side facing outward and said first side facing inward,
   a mounting member attached to said body and defining a loop, wherein at least a portion of said loop extends beyond a front edge of said body, and
   a front ring movably disposed within said loop of said mounting member, wherein said front ring is accessible when said body is disposed in said first orientation and worn by an animal, and said front ring is accessible when said body is disposed in said second orientation and worn by an animal.

8. The reversible dog harness as recited in claim 7 wherein said front ring comprises a D-ring.

9. The reversible dog harness as recited in claim 7 wherein a first portion of said mounting member is attached to said first side of said body and wherein a second portion of said mounting member is attached to said second side of said body.

10. The reversible dog harness as recited in claim 7 wherein said mounting member is disposed against said first side of said body but not against said second side of said body.

11. The reversible dog harness as recited in claim 7 wherein said mounting member is disposed against said second side of said body but not against said first side of said body.

12. A reversible dog harness, comprising:
   a body defining a collar portion and a chest portion,
   said body comprising a first side and a second side, said first side being opposite said second side, wherein said body is selectively positionable between a first orientation and a second orientation, said first orientation being defined as said first side facing outward and said second side facing inward, and said second orientation being defined as said second side facing outward and said first side facing inward, said body comprising a channel extending laterally through at least a part of said chest portion, a top strap extending rearwardly from a top of said collar portion, said top strap defining a loop, a rear strap disposed through said loop of said top strap and through said channel on said body, a top connector disposed proximate said top of said collar portion, a front connector disposed beyond a front edge of said collar portion of said body, and wherein said rear strap comprises a first portion and a second portion, said first portion being disposed through said loop of said top strap and said second portion being disposed through said channel of said body, wherein said first portion is removable from said second portion via two buckle assemblies.

\* \* \* \* \*